(12) United States Patent
Shimizu

(10) Patent No.: US 10,721,442 B2
(45) Date of Patent: Jul. 21, 2020

(54) SURROUND VIEW MONITOR APPARATUS

(71) Applicant: Socionext Inc., Kanagawa (JP)

(72) Inventor: Seiya Shimizu, Kanagawa (JP)

(73) Assignee: SOCIONEXT INC., Yokohama (JP)

( * ) Notice: Subject to any disclaimer, the term of this patent is extended or adjusted under 35 U.S.C. 154(b) by 25 days.

(21) Appl. No.: 16/020,147

(22) Filed: Jun. 27, 2018

(65) Prior Publication Data
US 2018/0309962 A1  Oct. 25, 2018

Related U.S. Application Data

(63) Continuation of application No. PCT/JP2016/050838, filed on Jan. 13, 2016.

(51) Int. Cl.
*H04N 7/18* (2006.01)
*B60R 1/00* (2006.01)
(Continued)

(52) U.S. Cl.
CPC ............. *H04N 7/181* (2013.01); *B60R 1/00* (2013.01); *E01H 5/098* (2013.01); *G06T 3/0018* (2013.01); *H04N 5/23238* (2013.01); *H04N 5/247* (2013.01); *H04N 5/2628* (2013.01); *H04N 5/272* (2013.01); *H04N 7/18* (2013.01); *B60R 2300/302* (2013.01); *B60R 2300/303* (2013.01); *B60R 2300/605* (2013.01); *B60R 2300/607* (2013.01); *B62D 12/00* (2013.01); *B62D 15/02* (2013.01)

(58) Field of Classification Search
None
See application file for complete search history.

(56) References Cited

U.S. PATENT DOCUMENTS

2005/0174429 A1* 8/2005 Yanai ................. B60R 1/00
                                                              348/148
2008/0044061 A1  2/2008 Hongo
(Continued)

FOREIGN PATENT DOCUMENTS

JP  S59-066683 U   5/1984
JP  2003-235036     8/2003
(Continued)

OTHER PUBLICATIONS

International Search Report of Int. Appl. No. PCT/JP2016/050838 dated Mar. 29, 2016.
(Continued)

*Primary Examiner* — Kate H Luo
(74) *Attorney, Agent, or Firm* — IPUSA, PLLC

(57) ABSTRACT

A surround view monitor apparatus includes two imaging devices mounted on a first vehicle section of an articulated vehicle to capture two respective images that include, within fields of view thereof, areas of view looking in a direction of a road surface area occupied by a second vehicle section in an unbent state, a control unit configured to select one of the two images as an image to be displayed on the road surface area in response to a bending angle between the first vehicle section and the second vehicle section, and configured to combine the two images to generate a synthesized image showing surroundings of the articulated vehicle, and a display monitor configured to display the synthesized image.

10 Claims, 14 Drawing Sheets

100C

(51) Int. Cl.
*H04N 5/262* (2006.01)
*H04N 5/232* (2006.01)
*G06T 3/00* (2006.01)
*H04N 5/247* (2006.01)
*H04N 5/272* (2006.01)
*B62D 12/00* (2006.01)
*B62D 15/02* (2006.01)
*E01H 5/09* (2006.01)

(56) References Cited

U.S. PATENT DOCUMENTS

| | | | |
|---|---|---|---|
| 2010/0171828 A1 | 7/2010 | Ishii | |
| 2011/0001825 A1* | 1/2011 | Hahn | B60R 1/00 348/148 |
| 2014/0088824 A1 | 3/2014 | Ishimoto | |
| 2016/0150189 A1* | 5/2016 | Kriel | H04N 7/181 348/148 |
| 2016/0301864 A1* | 10/2016 | Petrany | H04N 5/23238 |
| 2016/0366336 A1* | 12/2016 | Kuehnle | H04N 5/23238 |

FOREIGN PATENT DOCUMENTS

| | | |
|---|---|---|
| JP | 2008-077628 | 4/2008 |
| JP | 2009-107602 | 5/2009 |
| JP | 2009-232310 | 10/2009 |
| JP | 2010-030341 | 2/2010 |
| JP | 2012-105158 | 5/2012 |
| WO | 2009/031400 | 3/2009 |
| WO | 2012/157379 | 11/2012 |

OTHER PUBLICATIONS

Written Opinion of the International Searching Authority of Int. Appl. No. PCT/JP2016/050838 dated Mar. 29, 2016, with English translation of the relevant part.

Office Action dated Jan. 21, 2020 issued with respect to the basic Japanese Patent Application No. 2017-561439 with full machine translation.

* cited by examiner

FIG.22

| POLYGON ID | VERTEX ID |
|---|---|
| 1 | 1 |
|   | 2 |
|   | 4 |
|   | 3 |
| 2 | 3 |
|   | 4 |
|   | 6 |
|   | 5 |
| : |   |

FIG.23

| VERTEX ID | VERTEX COORDINATES ON PROJECTED PLANE | | | COORDINATES ON INPUT IMAGE | |
|---|---|---|---|---|---|
|   | X | Y | Z | S | T |
| 1 |   |   |   |   |   |
| 2 |   |   |   |   |   |
| 3 |   |   |   |   |   |
| 4 |   |   |   |   |   |
| 5 |   |   |   |   |   |
| 6 |   |   |   |   |   |
| : |   |   |   |   |   |

U.S. 10,721,442 B2

SURROUND VIEW MONITOR APPARATUS

CROSS-REFERENCE TO RELATED APPLICATIONS

This application is a continuation application of International Application PCT/JP2016/050838, filed on Jan. 13, 2016 and designated the U.S., the entire contents of which are incorporated herein by reference.

BACKGROUND OF THE INVENTION

1. Field of the Invention

The disclosures herein relate to a surround view monitor apparatus, an image processing method, and an image processing program.

2. Description of the Related Art

The structure of vehicles such as snow blower trucks tends to be an articulated vehicle. An articulated vehicle has a plurality of vehicle sections linked through one or more pivoting joints. The front and rear vehicle sections of a pivoting joint are placed at a desired angle to each other to provide a smaller turning radius. This arrangement enables a long vehicle to turn more sharply, allowing the vehicle to operate even in a small area.

In recent years, a vehicle safety function has been developed that utilizes a plurality of cameras to take images around the vehicle, and synthesize the obtained images to generate a virtual bird's eye view of the vehicle's surroundings, with such a downward image being displayed on the monitor in front of the driver's seat. It is conceivable to provide an articulated vehicle with functions to generate a downward image based on video images from wide-angle cameras attached to the front and rear of the vehicle and to display a synthesized image showing the vehicle surroundings on a single screen. In the case of non-articulated normal vehicles, the plan-view shape of the vehicle does not change, so that image synthesis and display processes can be performed at the time of turning (i.e., turning right or left) in the same manner as at the time of moving straight ahead.

In the case of an articulated vehicle, however, the shape of the vehicle differs between the time of moving straight ahead and the time of turning right or left. Performing the same image synthesis and display processes at the time of turning right or left as at the time of moving straight ahead thus fails to produce a proper image. At the time of turning left, for example, the rear vehicle section bulging at the left rear may appear in the synthesized image on the left side of the vehicle, and, also, an image of the road surface area exposed at the right rear after the rear vehicle section has left may not be displayed in the synthesized image, resulting in a blind spot being created. There is thus a problem of failing to provide an operator with a proper view of the surroundings for safety purposes.

Accordingly, it may be desired to provide a surround view monitor apparatus that provides a surround view in which a road surface area exposed by the bending of a vehicle is properly displayed.

RELATED-ART DOCUMENTS

Patent Document

[Patent Document 1] Japanese Patent No. 5369465
[Patent Document 2] Japanese Laid-open Patent Publication No. 2003-235036
[Patent Document 3] Japanese Laid-open Patent Publication No. 2009-107602
[Patent Document 4] International Publication Pamphlet No. WO2009/031400
[Patent Document 5] International Publication Pamphlet No. WO2012/157379

SUMMARY OF THE INVENTION

It is a general object of the present invention to provide a surround view monitor apparatus that substantially obviates one or more problems caused by the limitations and disadvantages of the related art.

According to an embodiment, a surround view monitor apparatus includes two imaging devices mounted on a first vehicle section of an articulated vehicle to capture two respective images that include, within fields of view thereof, areas of view looking in a direction of a road surface area occupied by a second vehicle section in an unbent state, a control unit configured to select one of the two images as an image to be displayed on the road surface area in response to a bending angle between the first vehicle section and the second vehicle section, and configured to combine the two images to generate a synthesized image showing surroundings of the articulated vehicle, and a display monitor configured to display the synthesized image.

According to at least one embodiment of the present disclosures, a surround view monitor apparatus provides a surround view in which a road surface area exposed by the bending of a vehicle is properly displayed.

BRIEF DESCRIPTION OF THE DRAWINGS

Other objects and further features of the present invention will be apparent from the following detailed description when read in conjunction with the accompanying drawings, in which:

FIG. 22 is a drawing illustrating an example of the data structure of a polygon data table; and FIG. 23 is a drawing illustrating an example of the data structure of the vertex data table.

DESCRIPTION OF THE PREFERRED EMBODIMENTS

In the following, embodiments of the invention will be described with reference to the accompanying drawings. In these drawings, the same or corresponding elements are referred to by the same or corresponding numerals, and a description thereof will be omitted as appropriate.

Figure 1:
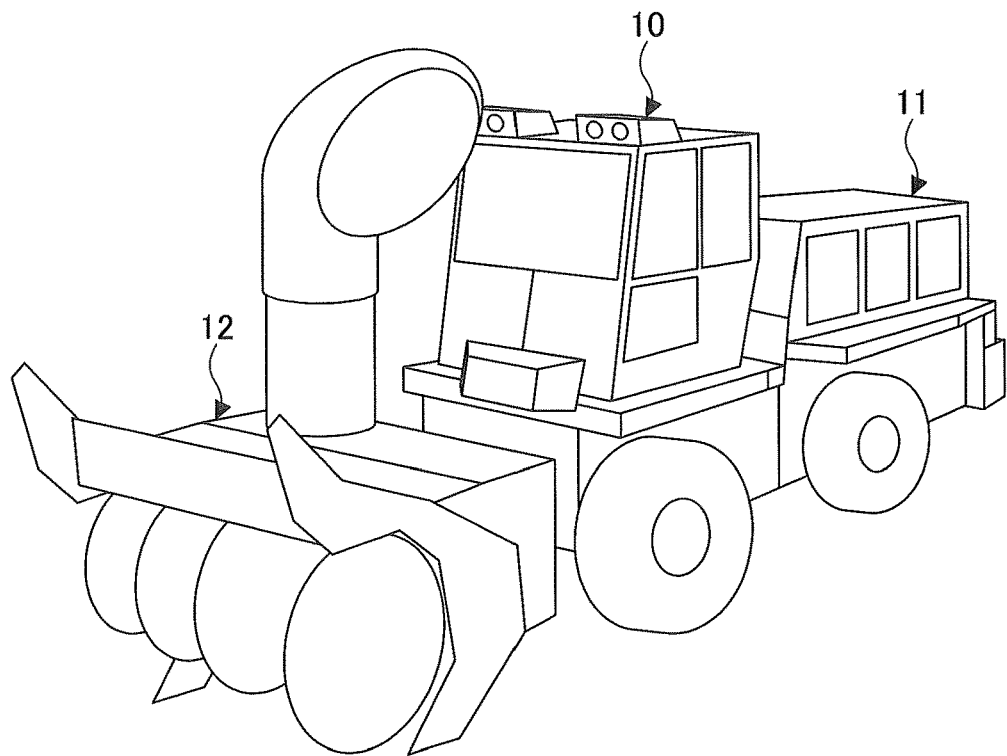
FIG. 1 is a drawing illustrating an example of the configuration of an articulated vehicle.

FIG. 1 is a drawing illustrating an example of the configuration of an articulated vehicle. The articulated vehicle illustrated in FIG. 1 is a snow blower truck, and includes a first vehicle section 10 with a driver cabin mounted thereon, a second vehicle section 11 with a drive power unit such as an engine mounted thereon, and a snow blower machine 12. The snow blower machine 12 utilizes an auger or impeller disposed at the bottom part to pull snow into the machine and to throw the snow out of the discharge chute disposed at the top part. The snow blower machine 12 is not limited to one which uses an auger or impeller, and may alternatively be one which uses a bucket or one or more blowing mechanisms. In the description that follows, a snow blower truck will be used as an example of an articulated vehicle. However, the articulated vehicle is not limited to a snow blower truck, and may alternatively be a winter-time work vehicle such as a snow melting vehicle or a snow plow truck, a wheel loader, a trailer truck, an articulated bus, etc.

Figure 2:
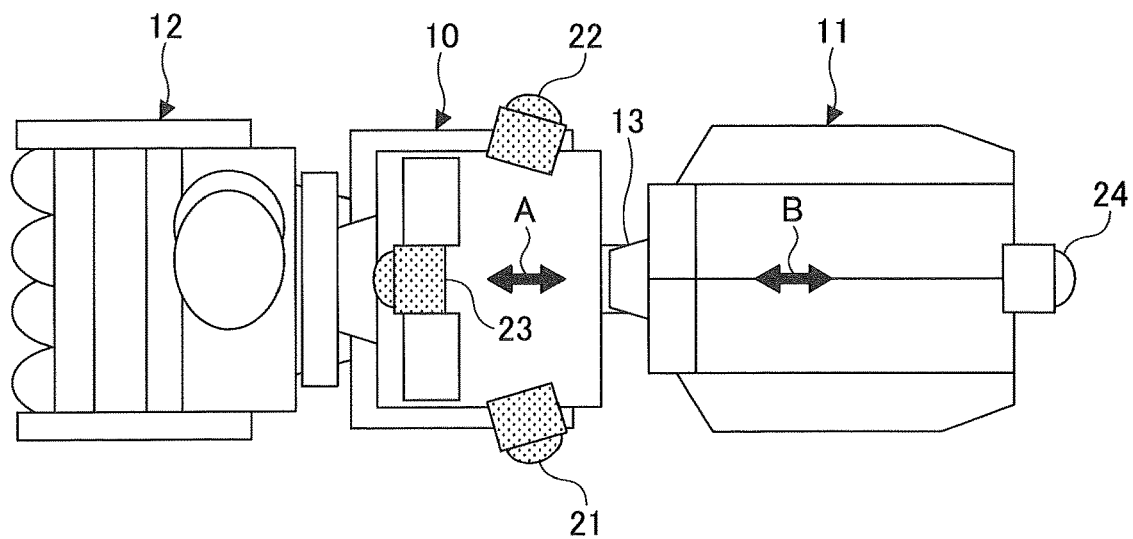
FIG. 2 is a top view of the articulated vehicle as viewed from above.

FIG. 2 is a top view of the articulated vehicle as viewed from above. The first vehicle section 10 and the second vehicle section 11 are linked to each other by a pivot joint 13. The center axis A of the first vehicle section 10 extending in the front and rear direction and the center axis B of the second vehicle section 11 extending in the front and rear direction are aligned in the same direction at the time of moving straight ahead as illustrated in FIG. 2. At the time of circling or turning right or left, the vehicle body bends such that the first vehicle section 10 and the second vehicle section 11 are placed at an angle to each other. The center axis A of the first vehicle section 10 and the center axis B of the second vehicle section 11 are oriented in different directions.

In the example illustrated in FIG. 2, the first vehicle section 10 is provided with a left camera 21, a right camera 22, and a front camera 23. The second vehicle section 11 is provided with a rear camera 24. The surround view monitor apparatus of the present disclosures selectively displays, as an image for a road surface area exposed by the bending of the vehicle, an image from the left camera 21 or an image from the right camera 22 in response to a bending angle of the vehicle. The front camera 23 and the rear camera 24 may not be necessarily provided for the purpose of the invention.

In the case of the front camera 23 being provided, the front camera 23 provides a view looking down at an angle in front of the vehicle to capture an image of the vehicle's surroundings inclusive of the road surface in front of the vehicle. In the case of the rear camera 24 being provided, the rear camera 24 provides a view looking down at an angle in rear of the vehicle to capture an image of the vehicle's surroundings inclusive of the road surface in rear of the vehicle. The left camera 21 provides a view looking down at an angle to the left of the vehicle to capture an image of the vehicle's surroundings inclusive of the road surface on the left of the vehicle. The right camera 22 provides a view looking down at an angle to the right of the vehicle to capture an image of the vehicle's surroundings inclusive of the road surface on the right of the vehicle.

Figure 3:
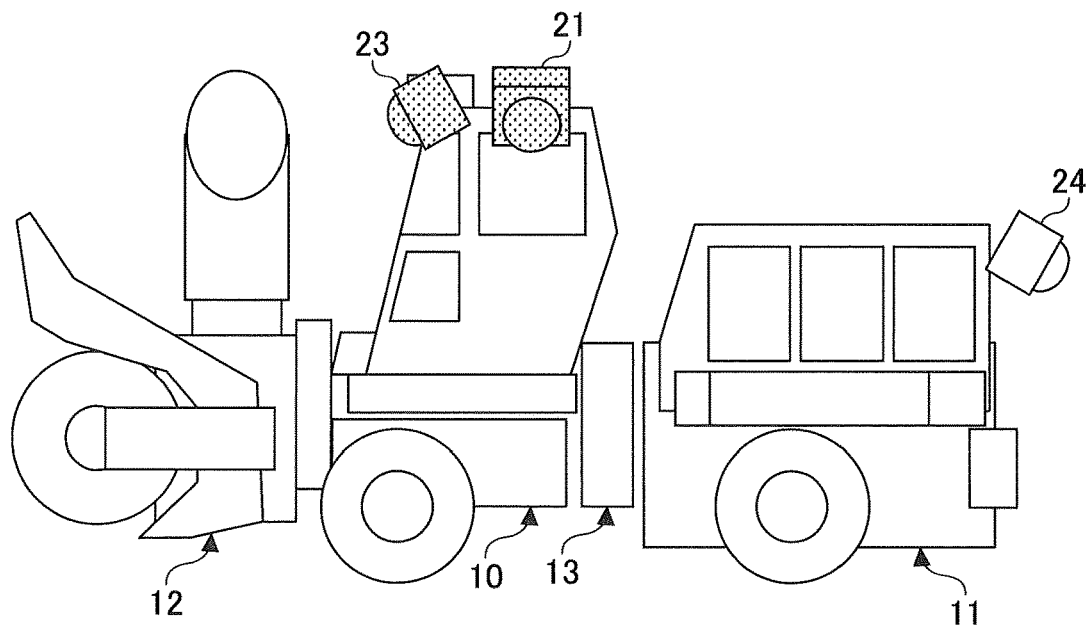
FIG. 3 is a side elevation view of the articulated vehicle as viewed from the left side.

FIG. 3 is a side elevation view of the articulated vehicle as viewed from the left side. As is schematically illustrated in FIG. 3, the front camera 23 is attached to the first vehicle section to face forward and look down at an angle, and the rear camera 24 is attached to the second vehicle section 11 to face backward and look down at an angle. The left camera 21 is attached to the first vehicle section 10 to look to the left of the vehicle and look down at an angle. Although not illustrated in FIG. 3, the right camera 22 is similarly attached to the first vehicle section 10 to look to the right of the vehicle and look down at an angle.

Figure 4:
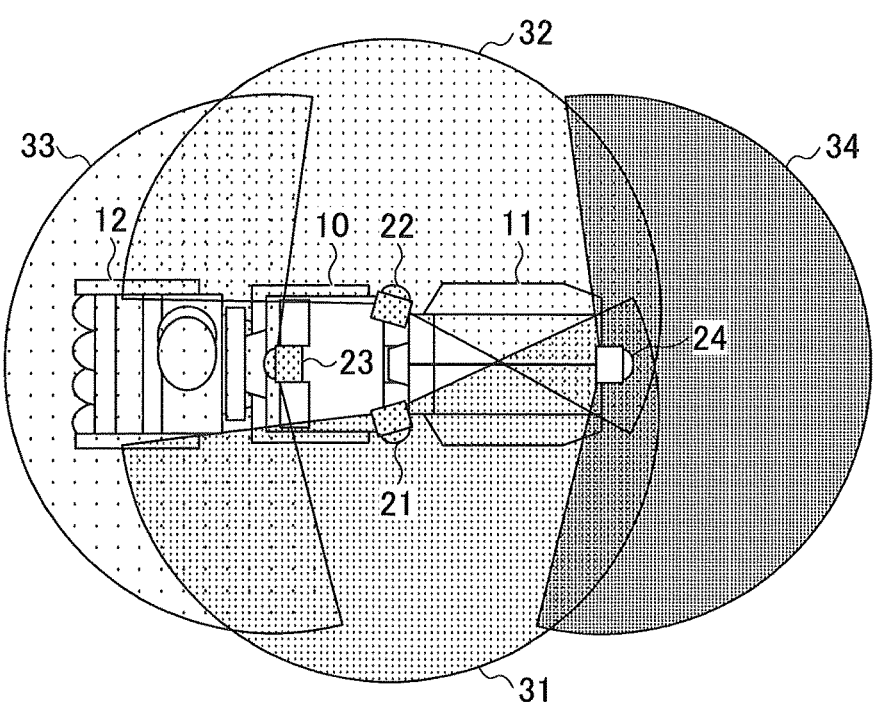
FIG. 4 is a drawing illustrating an example of the fields of view covered by a plurality of cameras.

FIG. 4 is a drawing illustrating an example of the fields of view covered by a plurality of cameras. The left camera 21, the right camera 22, the front camera 23, and the rear camera 24 have the respective fields of view 31, 32, 33, and 34. Each of the cameras 21 through 24 may be a wide-angle camera having the field of view covering a plane angle of 180 degrees or more. In particular, the left camera 21 and the right camera 22 are expected to be wide-angle cameras having a wide plane angle. The left camera 21 and the right camera 22 have areas of view looking in the direction of the road surface area that the second vehicle section 11 in the unbent state occupies in rear of the first vehicle section 10. These areas of view partially overlap between the left camera 21 and the right camera 22. Accordingly, those image portions captured by the left camera 21 and the right camera which look at such an area are a common image portion of the same area viewed from different angles in the two respective captured images.

At the time of moving straight ahead (i.e., in the unbent state), such a road surface area is hidden under the second vehicle section 11, and is thus not captured by either the left camera 21 or the right camera 22. In the images captured by the left camera 21 and the right camera 22, what are shown in the areas of view looking in the direction of such a road surface area are the left side face and right side face of the second vehicle section 11. At the time of turning left, the second vehicle section 11 is bent toward the left rear in rear of the first vehicle section 10, and the above-noted road surface area is exposed. The right camera 22 having the field of view 32 captures the image of the exposed road surface area. At the time of turning right, the second vehicle section 11 is bent toward the right rear in rear of the first vehicle section 10, and the above-noted road surface area is exposed. The left camera 21 having the field of view 31 captures the image of the exposed road surface area.

As was previously described, the surround view monitor apparatus of the present disclosures selectively displays, as an image for the road surface area exposed by the bending of the vehicle, an image from the left camera 21 or an image from the right camera 22 in response to a bending angle of the vehicle. The front camera 23 and the rear camera 24 may not be necessarily provided for the purpose of the invention. Namely, the surround view monitor apparatus of the present disclosures does not necessarily display the image of a full 360-degree view, and may merely display, as the image of the vehicle's surroundings, an image of peripheral areas corresponding to the field of view 31 of the left camera 21 and the field of view 32 of the right camera 22. For example, the surround view monitor apparatus may be provided with only the front camera 23, the left camera 21, and the right camera 22, without the rear camera 24.

Figure 5:
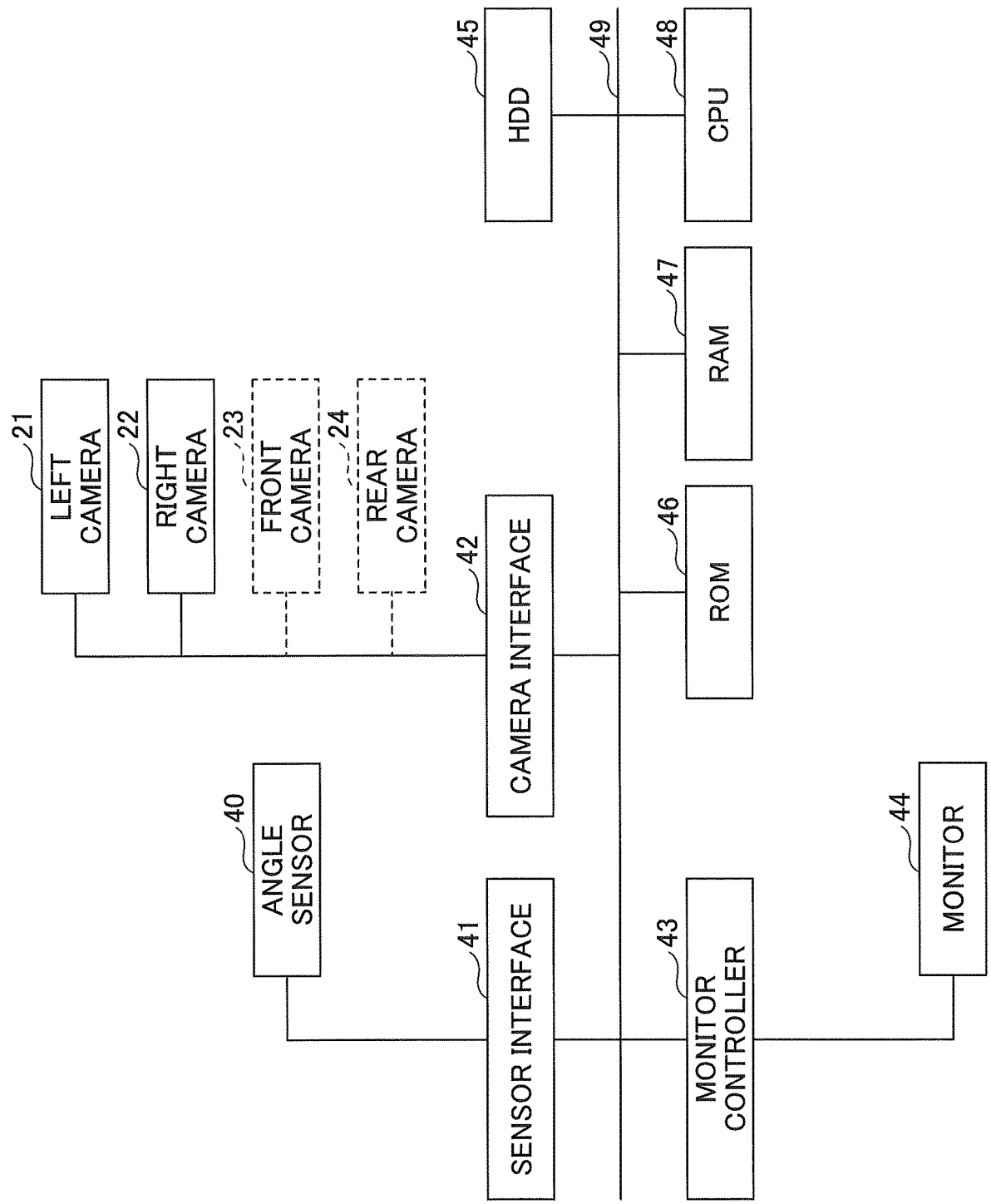
FIG. 5 is a drawing illustrating an example of the hardware configuration of a surround view monitor apparatus installed on an articulated vehicle.

FIG. 5 is a drawing illustrating an example of the hardware configuration of a surround view monitor apparatus installed on an articulated vehicle. The surround view monitor apparatus illustrated in FIG. 1 includes the left camera 21, the right camera 22, the front camera 23, the rear camera 24, an angle sensor 40, a sensor interface 41, a camera interface 42, a monitor controller 43, and a monitor 44. The surround view monitor apparatus further includes a HDD (hard-disk drive) 45, a ROM (read only memory) 46, a RAM (random access memory) 47, a CPU (central processing unit) 48, and a bus 49. As was previously described, the front camera 23 and the rear camera 24 are not necessarily provided.

The angle sensor 40 is coupled to the bus 49 through the sensor interface 41. The left camera 21, the right camera 22, the front camera 23, and the rear camera 24 are coupled to the bus 49 through the camera interface 42. The monitor 44 for displaying purposes is coupled to the bus 49 through the monitor controller 43. The sensor interface 41, the camera interface 42, the monitor controller 43, the HDD 45, the ROM 46, the RAM 47, and the CPU 48 are coupled to each other through the bus 49. The CPU 48, the ROM 46, and the RAM 47 serve as a computer to perform image processing for synthesizing, generating, and displaying an image for surround view monitor purposes.

The monitor 44 may display images or the like generated by the image processing, and may also be configured to display various data or the like and to receive user inputs or the like for the purpose of enabling interaction with the user when the user operates the surround view monitor apparatus. The image processing for the surround view monitor purposes is implemented by the CPU 48 executing computer programs. These computer programs may be stored in the HDD 45. The CPU 48 loads a program from the HDD 45 to the RAM 47 at the time of executing the program. The CPU 48 uses an available memory space of the RAM 47 as a work area to execute the program loaded to the RAM 47, thereby performing the image processing. The ROM 46 stores control programs for the purpose of controlling basic operations of the CPU 48 or the like.

Figure 6:
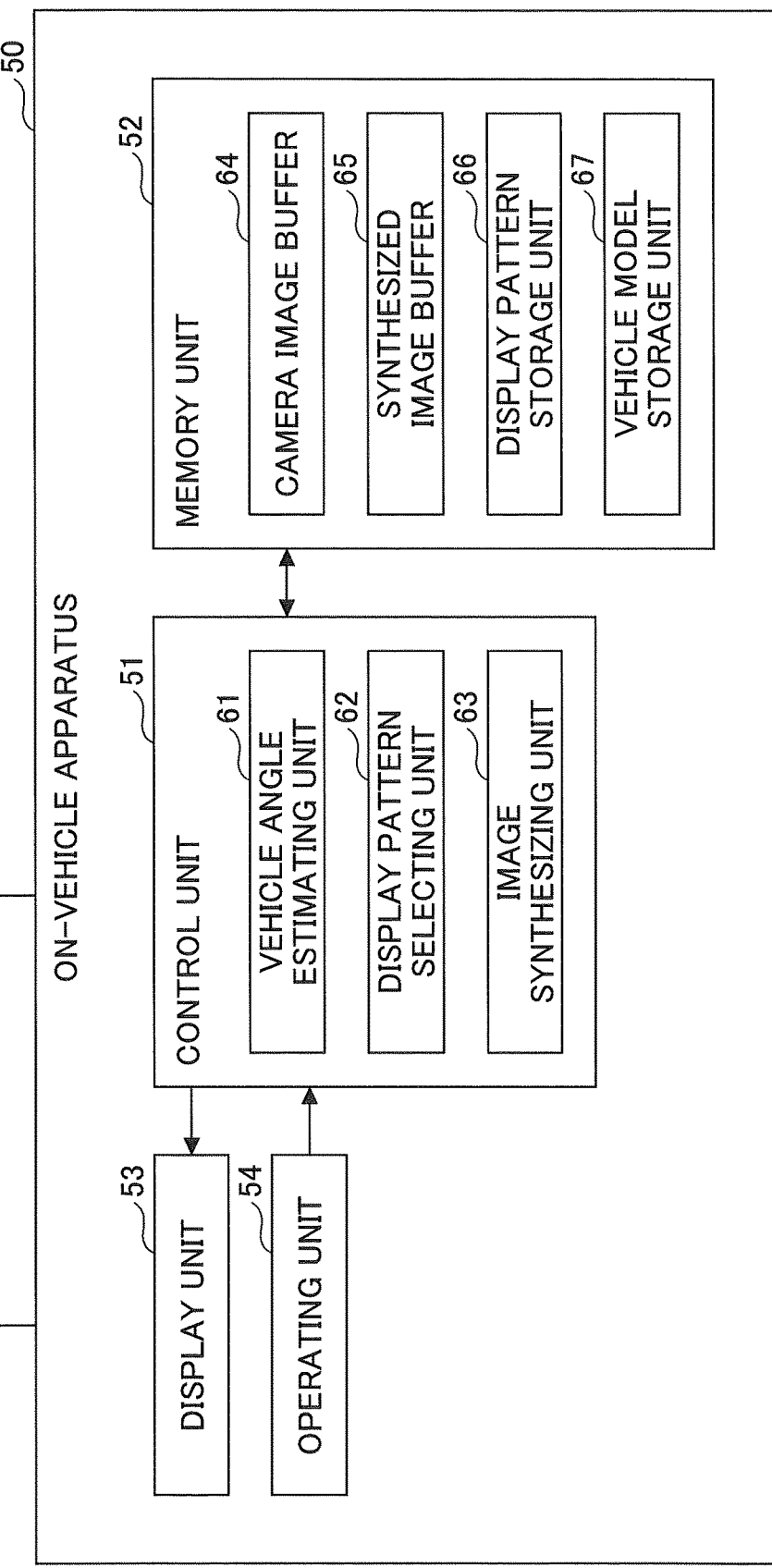
FIG. 6 is a drawing illustrating an example of the functional configuration of a surround view monitor apparatus installed on an articulated vehicle.

FIG. 6 is a drawing illustrating an example of the functional configuration of a surround view monitor apparatus installed on an articulated vehicle. In FIG. 6, boundaries between functional blocks illustrated as boxes basically indicate functional boundaries, and may not correspond to separation in terms of physical positions, separation in terms of electrical signals, separation in terms of control logic, etc.

The surround view monitor apparatus may have a hardware configuration implemented by combining electronic circuit blocks having the functions of respective functional blocks, or may have a software configuration in which the functions of respective functional blocks are implemented by software executed by a general-purpose processor that is an electronic circuit. The example of the hardware configuration illustrated in FIG. 5 is one by which each function of the surround view monitor apparatus is implemented as software. In the case of hardware implementation, each functional block may be a hardware module that is physically separated from other blocks to some extent, or may indicate a function in a hardware module in which this and other blocks are physically combined together. In the case of software implementation, each functional block may be a software module that is logically separated from other blocks to some extent, or may indicate a function in a software module in which this and other blocks are logically combined together.

The angle sensor 40 and the cameras 21 and illustrated in FIG. 6 may be electronic apparatuses implemented as physical devices. The front camera 23 and the rear camera 24 illustrated in FIG. 5 are omitted from illustration in FIG. 6. As was previously described, the front camera 23 and the rear camera 24 are not necessarily provided. The bending angle between the first vehicle section 10 and the second vehicle section 11 may be detected based on image data from the left camera 21 and the right camera 22. In the case of detecting the bending angle through image processing, the angle sensor 40 that is a tangible electronic apparatus is not necessary as a constituent element.

In FIG. 6, an on-vehicle apparatus 50 includes a control unit 51, a memory unit 52, a display unit 53, and an operating unit 54. The control unit 51 includes a vehicle angle estimating unit 61, a display pattern selecting unit 62, and an image synthesizing unit 63. The memory unit 52 includes a camera image buffer 64, a synthesized image buffer 65, a display pattern storage unit 66, and a vehicle model storage unit 67. The camera image buffer 64 may be a buffer area which stores images supplied from the cameras 21 and 22. The synthesized image buffer 65 may be a buffer area which stores synthesized images showing the vehicle's surroundings generated by the image processing.

The display pattern storage unit 66 may be a memory area which stores respective display patterns for an image displayed when the vehicle is unbent, an image displayed when the vehicle is bent rightward, and an image displayed when the vehicle is bent leftward. These display patterns may be definition patterns each identifying images used for respective image areas in a synthesized image when generating the synthesized image including the images of the vehicle and the images of surroundings. A display pattern for an unbent state, a display pattern for a rightward-bent state, and a display pattern for a leftward-bent state will be described in detail later.

The display pattern storage unit 66 may further store information for use in generating a synthesized image showing the vehicle's surroundings, e.g., information about the positions at which the cameras 21 and 22 (also cameras 23 and 24 as appropriate) are mounted, information about the directions in which the cameras are directed (i.e., the directions of view axes), information about image boundary patterns, etc. The image boundary patterns may include the position of a boundary between the image captured by the front camera 23 and the image captured by the left camera 21 and the position of a boundary between the image captured by the front camera 23 and the image captured by the right camera 22, as appear in the synthesized image showing the vehicle's surroundings. Similarly, the image boundary patterns may include the position of a boundary between the image captured by the rear camera 24 and the image captured by the left camera 21 and the position of a boundary between the image captured by the rear camera 24 and the image captured by the right camera 22, as appear in the synthesized image showing the vehicle's surroundings. In order to synthesize an image of the vehicle's surroundings, the captured images may be stitched together along the boundaries defined by these boundary data to generate a synthesized image comprised of a plurality of images. For the purpose of stitching two images along a boundary, the two images whose margins are cut along the boundary may simply be connected to each other along the boundary. Alternatively, the two images may be added together with respective weights in a border area covering a certain width across the boundary, such that the weights are changed from 0 to 1 from one edge of the border area to the other edge.

In order to efficiently perform such an image synthesis process, correspondence between coordinate positions on the plane of each captured image and coordinate positions on the plane of the synthesized image may be obtained in advance based on the positions and view directions of the cameras 21 through 24 mounted on the vehicle as well as the internal parameters of each camera. Such correspondence between coordinate positions may be stored in the display pattern storage unit 66 as a data table. Use of this data table enables efficient generation of a high-quality synthesized image. The data structure of the data table and the image synthesizing process based thereon will be described in detail later.

The vehicle model storage unit 67 may be a memory area which stores the two-dimensional models or three-dimensional models of the first vehicle section 10, the second vehicle section 11, and the snow blower machine 12 as vehicle models. These models include information about the external shapes of the first vehicle section 10, the second vehicle section 11, and the snow blower machine 12, information about the position of the pivot joint linking the first vehicle section 10 and the second vehicle section 11, and so on. The display pattern storage unit 66 may further store the real image or model image of the vehicle as viewed from above, which serves as a vehicle image inserted into the image of the vehicle's surroundings. The display pattern storage unit 66 may further store real images or model images for display purposes for use by a system that displays a synthesized image as viewed from a desired direction. Use of such model information enables generation of a vehicle image showing the vehicle bent at an angle corresponding to the estimated current bending angle.

As was previously described, the control unit 51 includes the vehicle angle estimating unit 61, the display pattern selecting unit 62, and the image synthesizing unit 63. The vehicle angle estimating unit 61 estimates the vehicle's current bending angle based on the information indicative of a bending angle from the angle sensor 40. The display pattern selecting unit 62 determines, in response to the bending angle estimated by the vehicle angle estimating unit 61, which one of a display image for the unbent state, a display image for the rightward-bent state, and a display image for the leftward-bent state is to be generated, i.e., which one of the display patterns is to be used.

The image synthesizing unit 63 generates a synthesized image based on the information indicative of the bending angle, the vehicle models stored in the vehicle model storage unit 67, and the display pattern selected by the display pattern selecting unit 62 from the plurality of display patterns stored in the display pattern storage unit 66. In so doing, the image synthesizing unit 63 generates, based on the images captured by the cameras 21 through 24 and by use of the previously-noted data table, a downward image indicative of the vehicle's surroundings as viewed from the viewpoint directly above the vehicle, and generates a synthesized image by inserting the vehicle image responsive to the bending angle into the downward image. The process of synthesizing an image of the vehicle's surroundings as viewed from a desired viewpoint will be described later. The synthesized image generated by the image synthesizing unit 63 is displayed on the display unit 53.

Upon a user operation being performed with respect to the surround view monitor apparatus, the operating unit 54 supplies data indicative of the operation to the control unit 51. The display unit 53 and the operating unit 54 may be provided as the functions of the monitor 44 illustrated in FIG. 5.

As was described in connection with FIG. 4, the cameras 21 and 22 are mounted on the first vehicle section 10 of the articulated vehicle to capture two respective images, which include, within their fields of view, areas of view looking in the direction of the same road surface area occupied by the second vehicle section 11 in the unbent state. The control unit 51 illustrated in FIG. 6 selects one of the two images as an image to be displayed for the above-noted road surface area in response to the bending angle between the second vehicle section and the first vehicle section 10, followed by combining the two images to generate a synthesized image showing the surroundings of the articulated vehicle. In the following, image processing performed by the on-vehicle apparatus 50 will be described by using an example of such a synthesized image.

Figure 7:
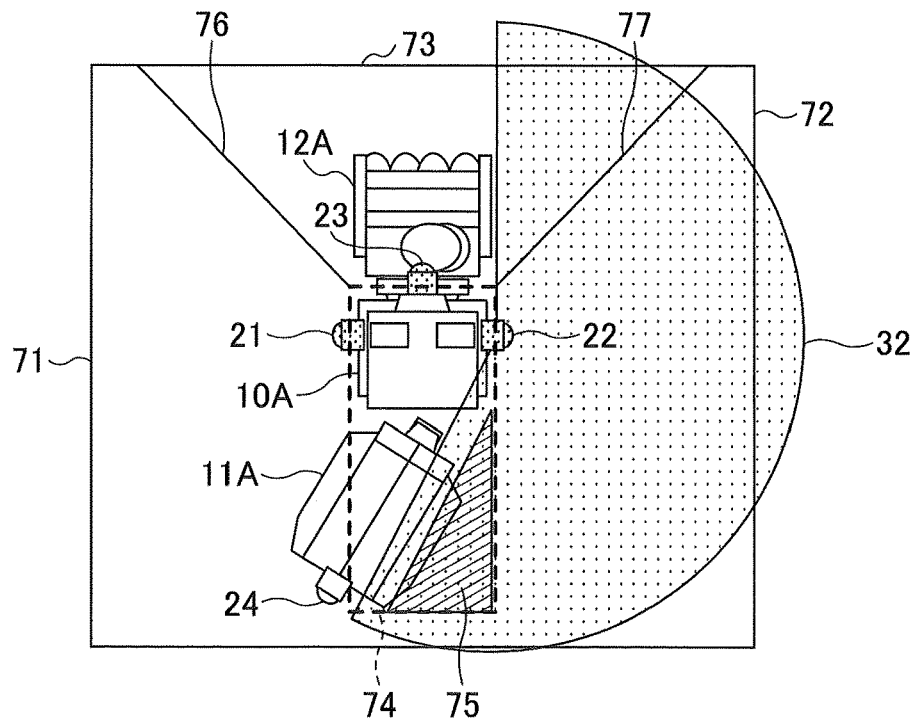
FIG. 7 is a drawing illustrating an example of an image synthesized by image processing.

FIG. 7 is a drawing illustrating an example of an image synthesized by image processing. A synthesized image 70 illustrated in FIG. 7 includes a vehicle image in the case of the vehicle bent leftward and an image of the vehicle's surroundings. Specifically, the synthesized image 70 includes a left-side image 71 captured by the left camera 21 and inserted into the synthesized image 70, a right-side image 72 captured by the right camera 22 and inserted into the synthesized image 70, and a front-side image 73 captured by the front camera 23 and inserted into the synthesized image 70. The boundary between the left-side image 71 and the front-side image 73 is a boundary 76, and the boundary between the right-side image 72 and the front-side image 73 is a boundary 77. Further, the synthesized image 70 includes a first-vehicle-section image 10A, a second-vehicle-section image 11A, and a snow-blower-machine image 12A corresponding to the respective vehicle sections in the leftward-bent state.

In a basic vehicle area 74 of the synthesized image 70 occupied by the first-vehicle-section image 10A and the second-vehicle-section image 11A in the unbent state, an auxiliary pattern image 75 is inserted into the road surface area exposed at the bottom right part in the drawing, i.e., at the right rear of the vehicle. In the unbent state, the basic vehicle area 74 is occupied by the first-vehicle-section image 10A and the second-vehicle-section image 11A, so that there is no need to display (i.e., render) an image captured by the left camera 21 or the right camera 22 in the basic vehicle area 74. Namely, it suffices to render the left-side image 71 on the left side of the left edge of the basic vehicle area 74, to render the right-side image 72 on the right side of the right edge of the basic vehicle area 74, and to render the first-vehicle-section image 10A and the secondvehicle-section image 11A in the unbent state inside the basic vehicle area 74, for example. Instead of rendering the first-vehicle-section image 10A and the second-vehicle-section image 11A, blank rectangular areas having the shapes corresponding to those of the first vehicle section 10 and the second vehicle section 11 may be rendered.

At the time of the bending of the vehicle for a right-or-left turn or circling movement, the second vehicle section 11 is bent in rear of the first vehicle section 10, thereby exposing the road surface area that was previously hidden under the second vehicle section 11 in the unbent state in the basic vehicle area 74. An image of this exposed area is patched with a partial image taken from the image captured by the left camera 21 at the position corresponding to the exposed road surface area, or patched with a partial image taken from the image captured by the right camera 22 at the position corresponding to the exposed road surface area, to generate the synthesized image 70. In so doing, the position patched within the basic vehicle area 74 and which one of the image captured by the left camera 21 and the image captured by the right camera 22 is inserted depend on whether the second vehicle section 11 is bent rightward or leftward. In response to whether the bending angle is rightward or leftward, the partial image of the image captured by the left camera 21 or the partial image of the image captured by the right camera 22 is selected, and, also, the position to be patched within the basic vehicle area 74 is selected, followed by inserting the selected partial image into the selected patch position.

In the case of the bent angle being leftward, the partial image in the image captured by the right camera 22 at the position corresponding to the exposed surface area is selected, and, also, a patch area having an approximately triangular shape situated at the right rear in the basic vehicle area is selected, followed by inserting the selected partial image into the selected patch area. Such an inserted image is the auxiliary pattern image 75 illustrated in FIG. 7. In the case of the bent angle being rightward, the partial image in the image captured by the left camera 21 at the position corresponding to the exposed surface area is selected, and, also, a patch area having an approximately triangular shape situated at the left rear in the basic vehicle area 74 is selected, followed by inserting the selected partial image into the selected patch area.

When inserting the partial image taken from an image captured by the left camera 21 or the right camera 22 into the basic vehicle area 74 as an auxiliary pattern image as described above, the auxiliary pattern may not only occupy the basic vehicle area 74 but also extend to the rear of the vehicle outside the basic vehicle area 74. In the example illustrated in FIG. 7, the bottom edge of the rectangular auxiliary pattern image 75 in the drawing coincides with the bottom edge of the basic vehicle area 74 in the drawing (i.e., the rear edge of the vehicle). Alternatively, the triangular auxiliary pattern image 75 may extend further downwards beyond the bottom edge of the basic vehicle area 74 in the drawing. With this arrangement, the image of the surroundings situated in rear of the vehicle captured by the right camera 22 after the second vehicle section 11 is bent can be utilized for the synthesized image. As for the view in the direction in which the rear of the second vehicle section 11 faces, the rear-side image captured by the rear camera 24 may be inserted in the case in which the rear camera 24 is provided. When the rear camera 24 is not provided, a periphery area in the direction in which the rear of the second vehicle section 11 faces may include an area which is not viewable by either the left camera 21 or the right camera 22 and for which a blank image may be displayed.

The shape of the auxiliary pattern image illustrated as an example in FIG. 7 may be changed depending on the bending angle, or may be constant regardless of what the bending angle is. In the case of changing the shape of the auxiliary pattern image 75 according to the bending angle, the auxiliary pattern image 75 may be generated by adaptively changing the angle of the top corner (i.e., corner situated toward the front of the vehicle) of the triangular auxiliary pattern image such that the angle becomes substantially equal to the bending angle. However, the second-vehicle-section image 11A may be superimposed in such a manner as to overlay the captured image area in the synthesized image 70. In such a case, there is no need to change the rendering area of the auxiliary pattern image 75 every time in response to the bending angle once the auxiliary pattern image 75 having an area of sufficient size is generated.

For example, in the case in which the auxiliary pattern image 75 is generated based on the image captured by the right camera 22, the auxiliary pattern image 75 having a maximum size extractable from the image captured by the right camera 22 (i.e., such as to extend all the way to the left edge of the field of view 32 of the right camera 22) may be generated and inserted into the synthesized image 70. On top of the auxiliary pattern image 75 inserted in such a manner, the second-vehicle-section image 11A is rendered and superimposed at an angle corresponding to the bending angle, which generate a realistic image in which the road surface is exposed according to the size of the angle. In the case of a small bending angle, the right lateral face of the second vehicle section 11 occupies a substantially large area in the auxiliary pattern image 75. However, the second-vehicle-section image 11A is rendered and superimposed on such an area, which thus results in the generation of a realistic image.

If the rear camera 24 is provided in this case, the image captured by the rear camera 24 may be rendered in the rectangular area extending straight in rear of the second-vehicle-section image 11A that is rendered at an angle corresponding to the bending angle. Namely, the image captured by the rear camera 24 may be rendered in the area situated between the rear-side imaginary extension of the left-edge line and the rear-side imaginary extension of the right-edge line of the second-vehicle-section image 11A which is rendered at an angle corresponding to the bending angle. The manner in which the boundaries are set between the image captured by the rear camera 24 and the respective images captured by the left camera 21 and the right camera 22 are not limited to the above-described manner.

As described above, the control unit 51 may generate the first-vehicle-section image 10A and the second-vehicle-section image 11A of the articulated vehicle in response to the bending angle, followed by rendering and superimposing the generated vehicle image on the captured images to generate the synthesized image 70. In so doing, the control unit 51 may generate the vehicle image of the articulated vehicle bent at an angle corresponding to the bending angle to render such a vehicle image on top of the captured images. With this arrangement, it suffices for the control unit 51 to treat the auxiliary pattern image 75 as having a constant size regardless of the bending angle when generating and inserting the auxiliary pattern image into the synthesized image 70 as an image displayed on the road surface area, thereby simplifying the process.

Figure 8:
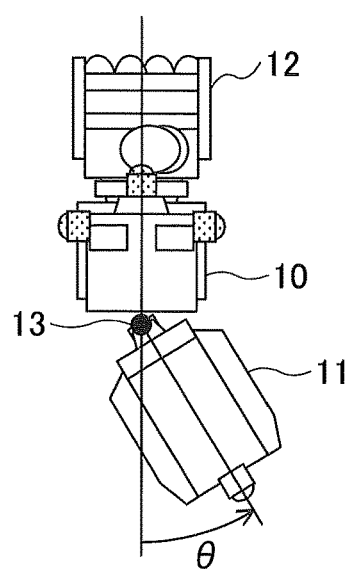
FIG. 8 is a drawing illustrating the definition of a bending angle when the vehicle is bent.

FIG. 8 is a drawing illustrating the definition of a bending angle when the vehicle is bent. When the second vehicle section 11 is bent relative to the first vehicle section 10 at an angle, the bending angle is defined as an angle θ formed between the central axis extending in the front and rear direction of the first vehicle section 10 and the central axis extending in the front and rear direction of the second vehicle section 11. The angle θ is positive in the rightward-bent state, and is negative in the leftward-bent state.

Figure 9:
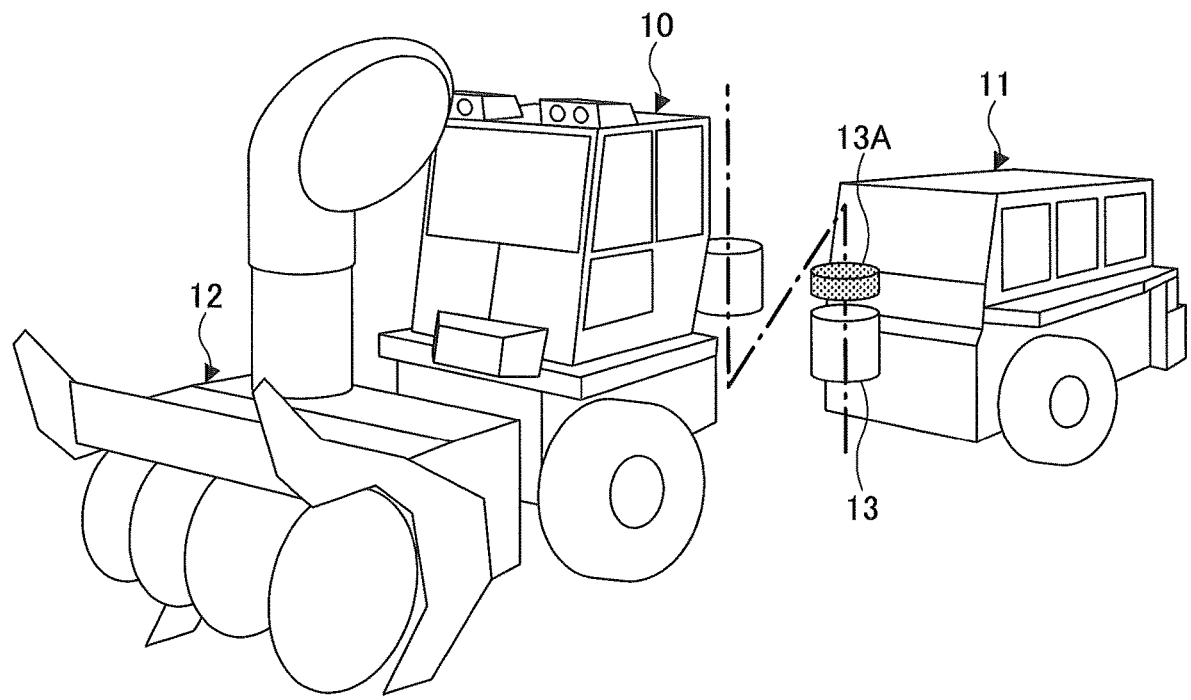
FIG. 9 is a drawing illustrating an example of the configuration of an angle sensor.

FIG. 9 is a drawing illustrating an example of the configuration of the angle sensor 40. In FIG. 9, the angle sensor 40 is a sensor device 13A disposed at the pivot joint 13 between the first vehicle section 10 and the second vehicle section 11. The sensor device 13A may detect the angle of the second vehicle section 11 relative to the first vehicle section 10 at the pivot joint 13, followed by sending the detected angle to the on-vehicle apparatus 50 as information indicative of the bending angle. Detecting an angle at the pivot joint in this manner enables a highly accurate angle detection reflecting the actual bending angle.

Figure 10:
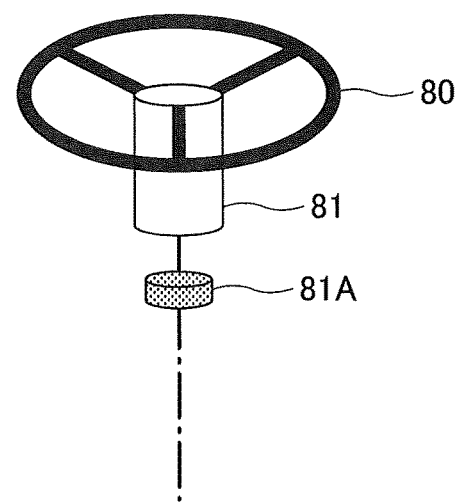
FIG. 10 is a drawing illustrating another example of the configuration of an angle sensor.

FIG. 10 is a drawing illustrating another example of the configuration of the angle sensor 40. In FIG. 10, the angle sensor 40 is a sensor device 81A disposed at a rotation shaft 81 of a steering wheel 80 installed in the driver cabin of the first vehicle section 10. The sensor device 81A may detect the rotation angle of the steering wheel 80 serving as an apparatus for controlling a steering angle, followed by sending the detected angle to the on-vehicle apparatus 50 as information indicative of the bending angle. It is a general configuration for the steering apparatus to be provided with the function to detect a steering angle. Utilizing such a function of the steering apparatus to detect an angle enables an efficient angle detection without the need for an additional angle sensor.

Figure 11:
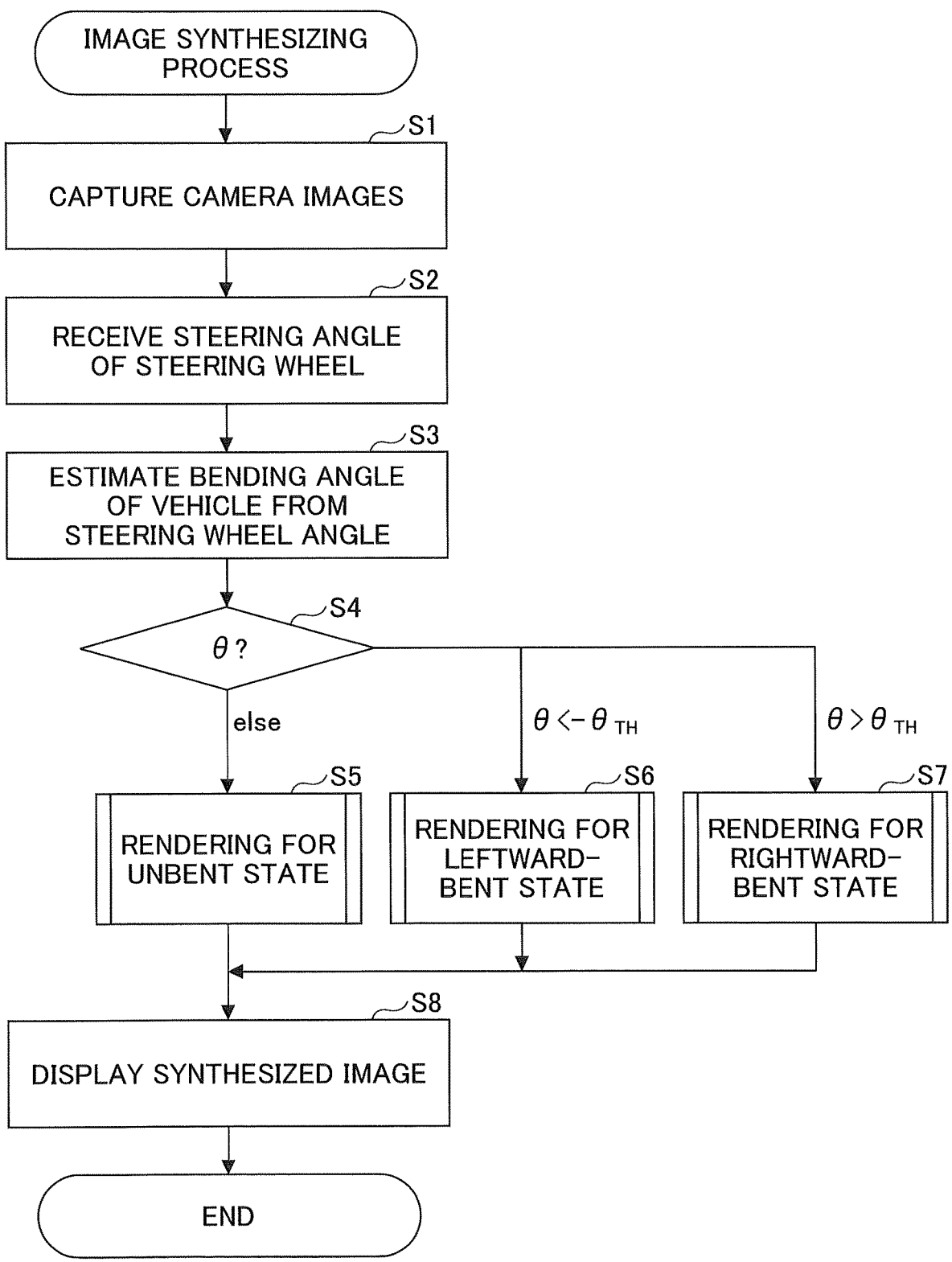
FIG. 11 is a flowchart illustrating an example of the image synthesizing process performed by an on-vehicle apparatus.

FIG. 11 is a flowchart illustrating an example of the image synthesizing process performed by the on-vehicle apparatus 50. In FIG. 11 and the subsequent flowcharts, an order in which the steps illustrated in the flowchart are performed is only an example. The scope of the disclosed technology is not limited to the disclosed order. For example, a description may explain that an A step is performed before a B step is performed. Despite such a description, it may be physically and logically possible to perform the B step before the A step while it is possible to perform the A step before the B step. In such a case, all the consequences that affect the outcomes of the flowchart may be the same regardless of which step is performed first. It then follows that, for the purposes of the disclosed technology, it is apparent that the B step can be performed before the A step is performed. Despite the explanation that the A step is performed before the B step, such a description is not intended to place the obvious case as described above outside the scope of the disclosed technology. Such an obvious case inevitably falls within the scope of the technology intended by this disclosure.

In step S1, the cameras 21 through 24 captures images of the vehicle's surroundings under the control of the on-vehicle apparatus 50, and the captured images (i.e., video images) are stored in the camera image buffer 64. In step S2, the vehicle angle estimating unit 61 of the control unit 51 obtains angle information from the angle sensor 40. For example, angle information indicative of the angle of the steering wheel is obtained from the sensor device 81A illustrated in FIG. 10.

In step S3, the vehicle angle estimating unit 61 estimates a vehicle bending angle θ (see FIG. 8) based on the angle information obtained in step S2. In step S4, the display pattern selecting unit uses a predetermined positive threshold $\theta_{TH}$ to determine whether the estimated vehicle bending angle θ is less than $-\theta_{TH}$, or greater than $+\theta_{TH}$, or otherwise (i.e., $-\theta_{TH} \le \theta \le +\theta_{TH}$). In the case of $-\theta_{TH} \le \theta \le +\theta_{TH}$, the display pattern selecting unit selects a display pattern for an unbent-state. Based on this selection result, the image synthesizing unit 63 performs rendering for an unbent state in step S5. In the case of $\theta < -\theta_{TH}$, the display pattern selecting unit 62 selects a display pattern for a leftward-bent state. Based on this selection result, the image synthesizing unit 63 performs rendering for a leftward-bent state in step S6. In the case of $+\theta_{TH} < \theta$, the display pattern selecting unit 62 selects a display pattern for a rightward-bent state. Based on this selection result, the image synthesizing unit 63 performs rendering for a rightward-bent state in step S7. In step S8, the image synthesizing unit 63 displays the synthesized image on the display unit 53.

Figure 12:
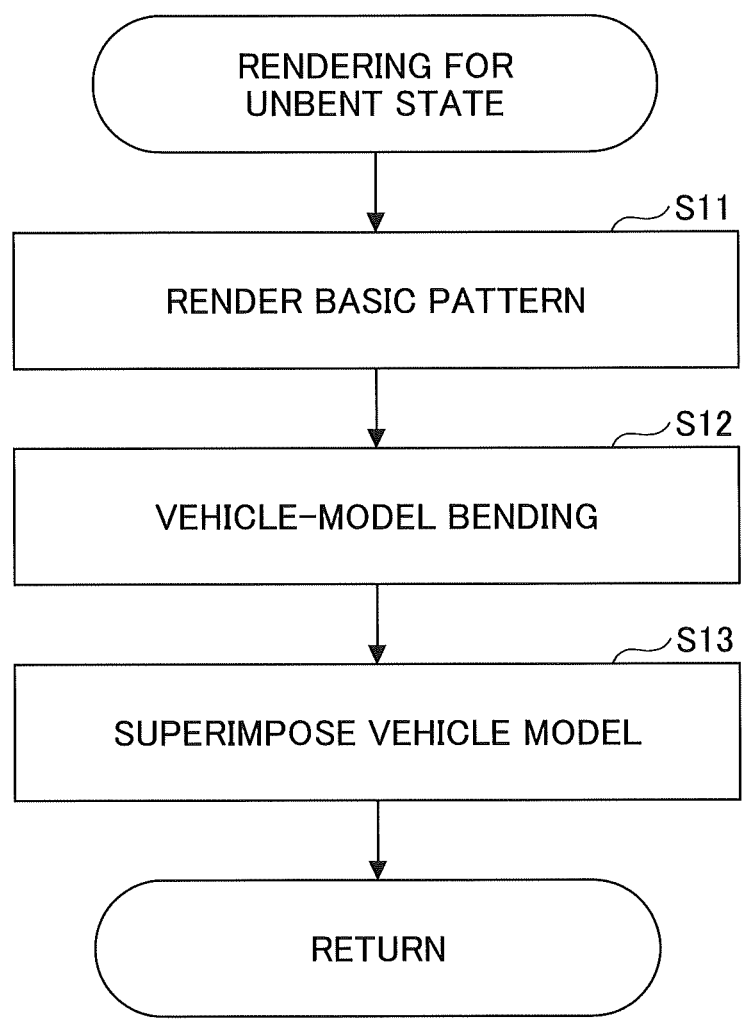
FIG. 12 is a flowchart illustrating an example of rendering for an unbent state.

FIG. 12 is a flowchart illustrating an example of rendering for an unbent state. In step S11, the image synthesizing unit 63 renders a basic pattern.

Figure 13:
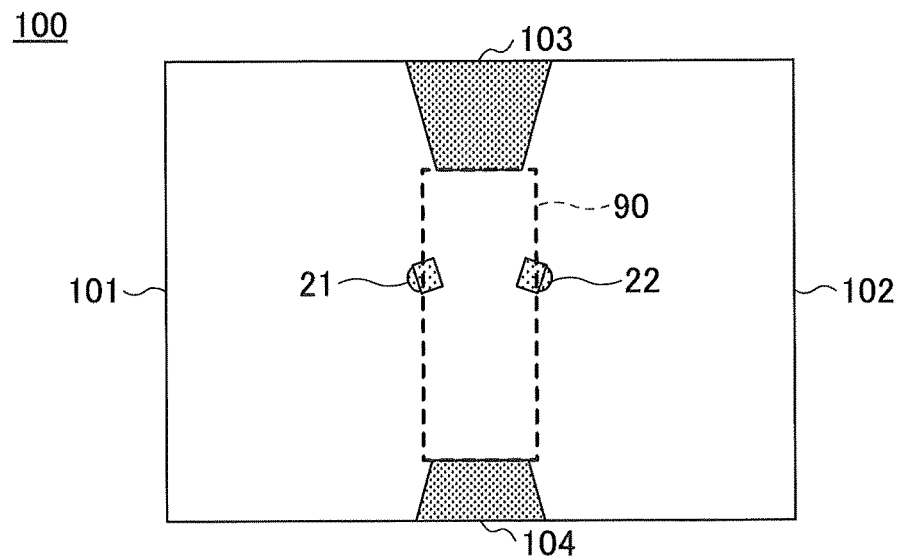
FIG. 13 is a drawing illustrating an example of the configuration of a basic pattern.

FIG. 13 is a drawing illustrating an example of the configuration of the basic pattern. A basic pattern 100 includes a newest left-side image 101 captured by the left camera 21, a newest right-side image 102 captured by the right camera 22, a newest front-side image 103 captured by the front camera 23, and a newest rear-side image 104 captured by the rear camera 24. These newest images 101 through 104 are stitched together along the boundaries such as those illustrated in FIG. 13 to generate a synthesized image comprised of current images of the vehicle's surroundings rendered around a vehicle area 90. The vehicle area 90 may be an area which is occupied by the first vehicle section and the second vehicle section 11 in an unbent state and around which the cameras 21 through 24 are disposed. In the case of no rear camera 24 being provided, a blank image may be rendered in the image area for the rear-side image 104 in the basic pattern 100. Similarly, in the case of no front camera 23 being provided, a blank image may be rendered in the image area for the front-side image 103 in the basic pattern 100.

Referring to FIG. 12 again, the image synthesizing unit 63 performs a vehicle-model bending process in step S12. Specifically, the image synthesizing unit 63 generates a vehicle image in an unbent state based on the vehicle models stored in the vehicle model storage unit 67 of the memory unit 52 illustrated in FIG. 6. In step S13, the image synthesizing unit 63 renders the vehicle image generated in step S12 such as to superimpose the vehicle image on top of the basic pattern.

Figure 14:
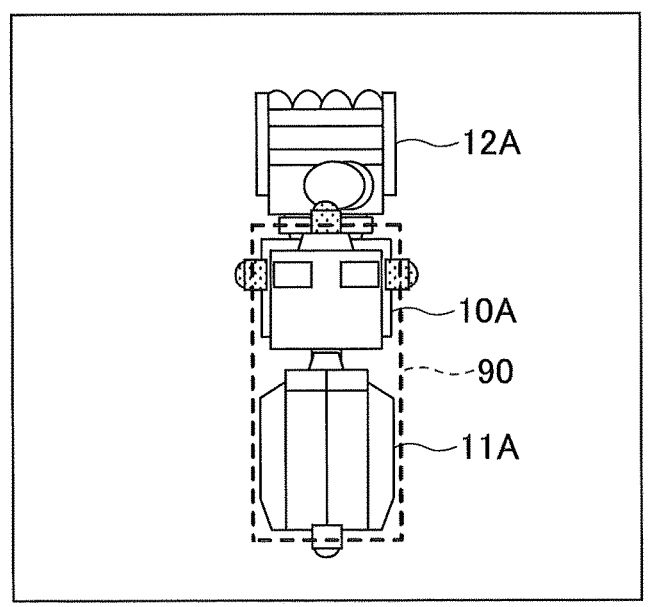
FIG. 14 is a drawing illustrating an example of a synthesized image in which a vehicle image is superimposed on the basic pattern.

FIG. 14 is a drawing illustrating an example of a synthesized image in which the vehicle image is superimposed on the basic pattern. A synthesized image 100A illustrated in FIG. 14 is obtained by rendering and superimposing the vehicle image including the first-vehicle-section image 10A, the second-vehicle-section image 11A, and the snow-blower-machine image 12A on the basic pattern 100 such as the one illustrated in FIG. 13. The front camera 23 is mounted near the ceiling of the first vehicle section 10, so that the front camera 23 can capture the image of the snow blower machine 12. In place of the snow-blower-machine image 12A, therefore, the captured image of the snow blower machine 12 may be displayed in the synthesized image 100A.

In the manner as described above, the basic pattern rendering, the vehicle-model bending process, and the vehicle-model superimposing are performed to complete the rendering for an unbent state.

Figure 15:
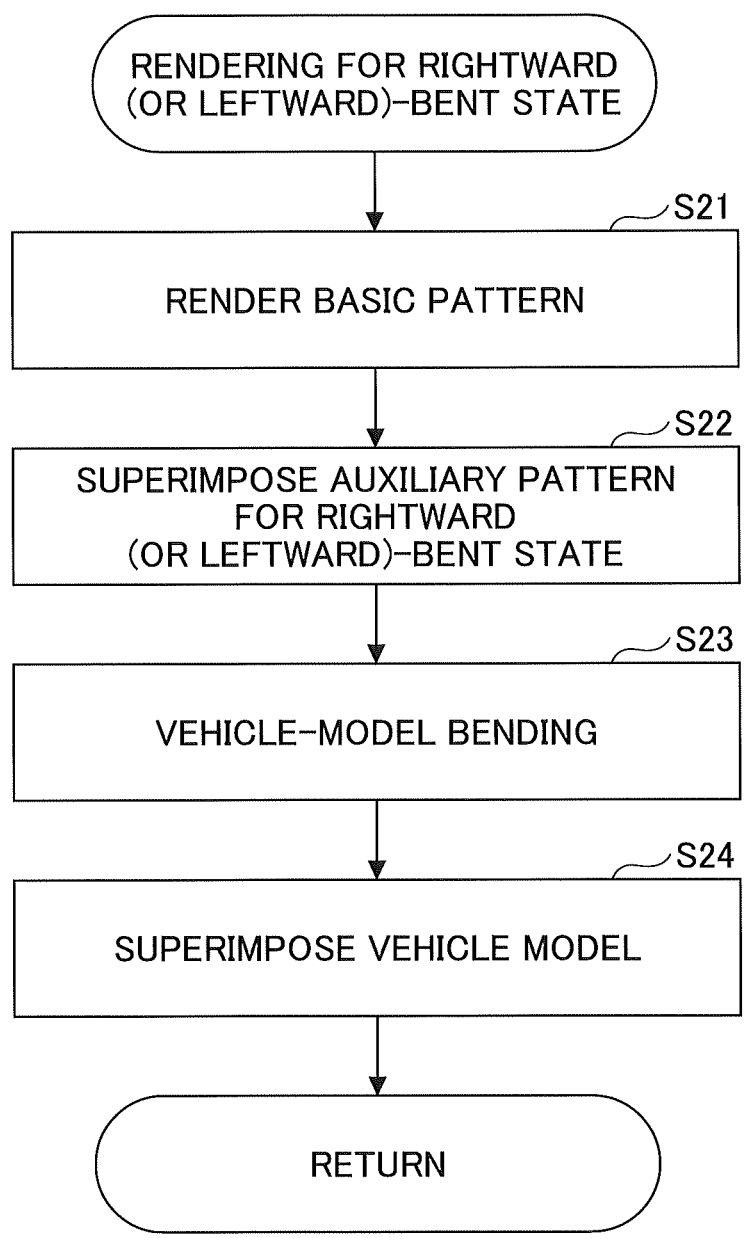
FIG. 15 is a flowchart illustrating an example of rendering for a bent state.

FIG. 15 is a flowchart illustrating an example of rendering for a bent state. In step S21, the image synthesizing unit 63 renders a basic pattern. The basic pattern may be the one illustrated in FIG. 13. In step S22, the image synthesizing unit 63 performs a rendering process that superimposes an auxiliary pattern for a rightward (or leftward) bent state. Specifically, in the case of rendering for a leftward-bent state, for example, an auxiliary pattern image having a substantially triangular shape is rendered and superimposed in an area including a triangular area at a right rear inside the vehicle area and also a rear area outside the vehicle area as appropriate. If the rear camera 24 is provided, an image captured by the rear camera 24 may be rendered in rear of the vehicle at the position corresponding to the bending angle.

Figure 16:
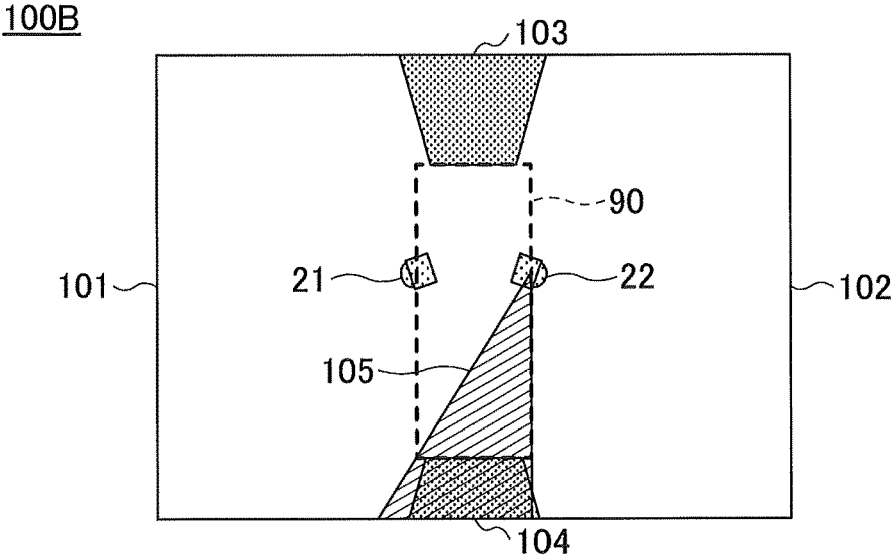
FIG. 16 is a drawing illustrating an example of a synthesized image in which an auxiliary pattern for a leftward-bent state is superimposed.

FIG. 16 is a drawing illustrating an example of a synthesized image in which an auxiliary pattern for a leftward-bent state is superimposed. As illustrated in FIG. 16, an auxiliary pattern image 105 having a substantially triangular shape is rendered and superimposed in an area including a triangular area at a right rear inside the vehicle area 90 and also a rear area outside the vehicle area 90 as appropriate. In so doing, the auxiliary pattern image 105 may be superimposed on top of the rendered image of the basic pattern 100. If the rear camera 24 is provided, an image captured by the rear camera 24 may be rendered in rear of the vehicle in a superimposing manner at the position corresponding to the bending angle. This rendering process serves to generate a synthesized image 100B.

Figure 18:
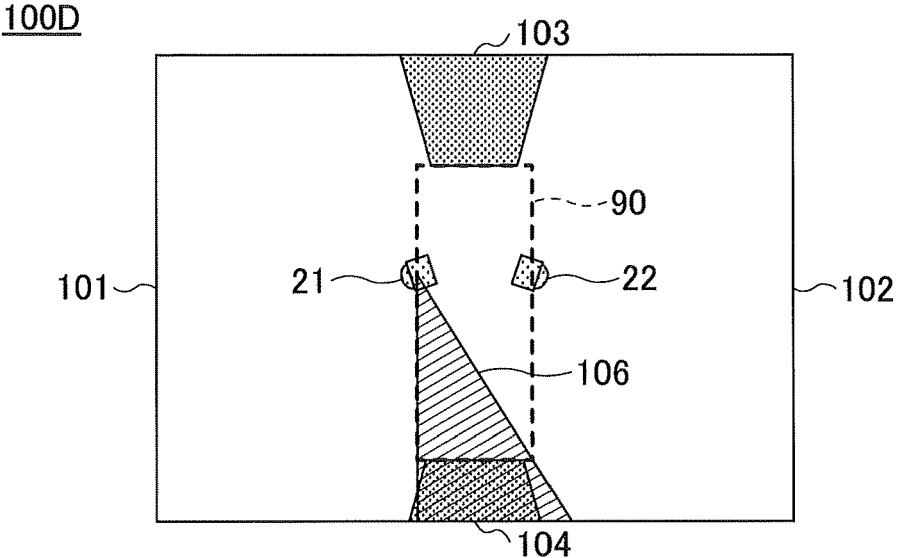
FIG. 18 is a drawing illustrating an example of a synthesized image in which an auxiliary pattern for a rightward-bent state is superimposed.

FIG. 18 is a drawing illustrating an example of a synthesized image in which an auxiliary pattern for a rightward-bent state is superimposed. As illustrated in FIG. 18, an auxiliary pattern image 106 having a substantially triangular shape is rendered and superimposed in an area including a triangular area at a left rear inside the vehicle area 90 and also a rear area outside the vehicle area 90 as appropriate. In so doing, the auxiliary pattern image 106 may be superimposed on top of the rendered image of the basic pattern 100. If the rear camera 24 is provided, an image captured by the rear camera 24 may be rendered in rear of the vehicle in a superimposing manner at the position corresponding to the bending angle. This rendering process serves to generate a synthesized image 100D.

Referring to FIG. 15 again, the image synthesizing unit 63 performs a vehicle-model bending process in step S23. Specifically, the image synthesizing unit 63 generates a vehicle image in a rightward-or-leftward-bent state based on the vehicle models stored in the vehicle model storage unit 67 of the memory unit 52 illustrated in FIG. 6. In step S24, the image synthesizing unit 63 renders and superimposes the vehicle image generated in step S23 on top of the synthesized image generated in step S22.

Figure 17:
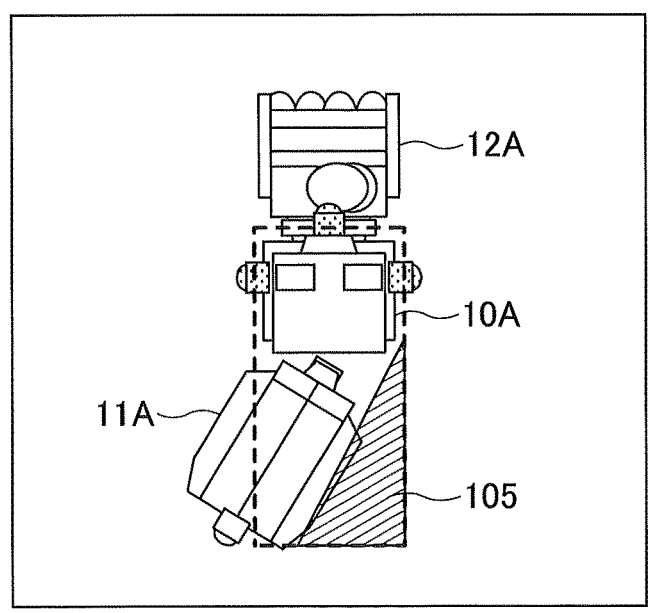
FIG. 17 is a drawing illustrating an example of a synthesized image in which a vehicle image is superimposed in a leftward-bent state.

FIG. 17 is a drawing illustrating an example of a synthesized image in which the vehicle image is superimposed in a leftward-bent state. A synthesized image 100C illustrated in FIG. 17 is obtained by rendering and superimposing the vehicle image including the first-vehicle-section image 10A, the second-vehicle-section image 11A, and the snow-blower-machine image 12A on the synthesized image 100B such as the one illustrated in FIG. 16.

Figure 19:
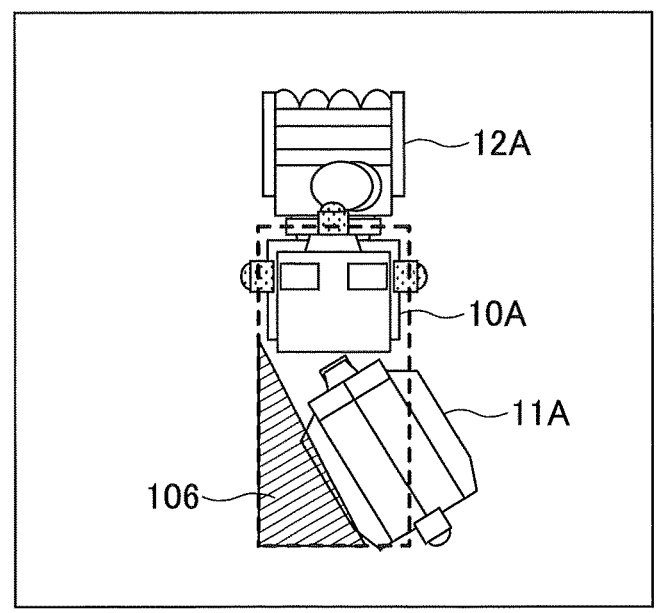
FIG. 19 is a drawing illustrating an example of a synthesized image in which a vehicle image is superimposed in a rightward-bent state.

FIG. 19 is a drawing illustrating an example of a synthesized image in which the vehicle image is superimposed in a rightward-bent state. A synthesized image 100E illustrated in FIG. 19 is obtained by rendering and superimposing the vehicle image including the first-vehicle-section image 10A, the second-vehicle-section image 11A, and the snow-blower-machine image 12A on the synthesized image 100D such as the one illustrated in FIG. 18.

In the manner as described above, the basic pattern rendering, the vehicle-model bending process, and the vehicle-model superimposing are performed to complete the rendering for an unbent state.

In the rendering process described above, a downward image of the vehicle's surroundings is synthesized based on the images captured by the cameras 21 through 24. In such an image synthesizing process, a downward image may be synthesized from captured images by performing image coordinate transformation based on the positions and view directions of the cameras 21 through 24 mounted on the vehicle as well as information about the internal parameters of these cameras. In the following, a process of synthesizing the image of a vehicle's surroundings as viewed from a desired viewpoint will be described.

Figure 20:
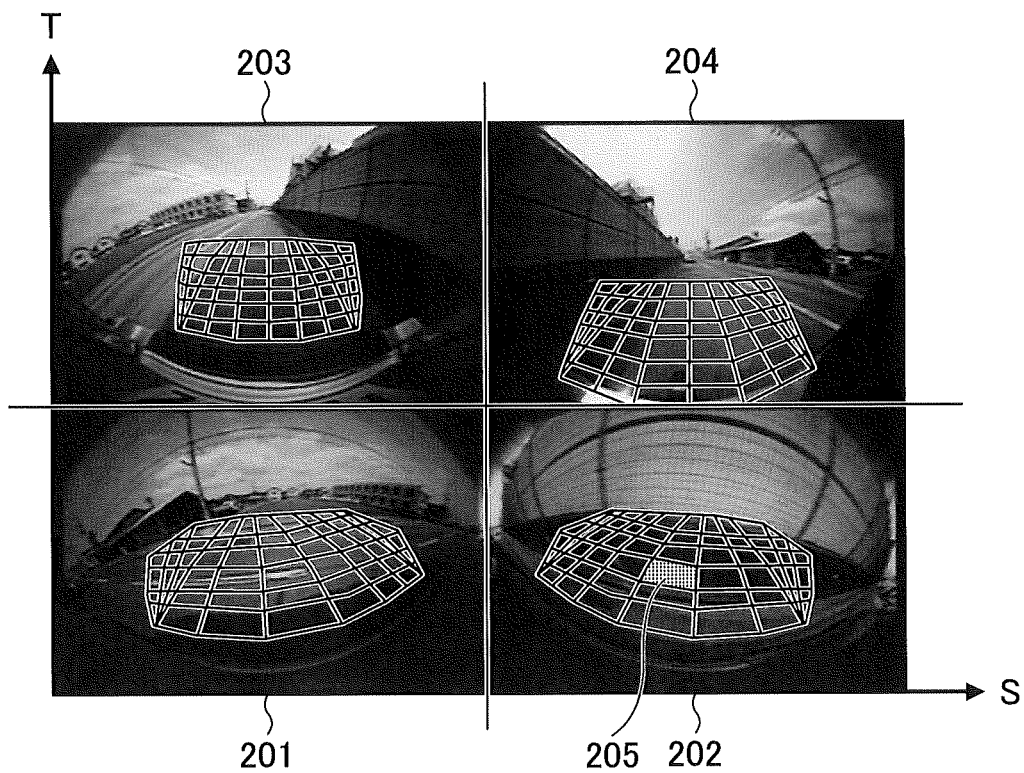
FIG. 20 is a drawing illustrating an example of captured images around a vehicle.

FIG. 20 is a drawing illustrating an example of captured images around a vehicle. A captured image 201 is an image captured by the left camera 21, and a captured image 202 is an image captured by the right camera 22. A captured image 203 is an image captured by the front camera 23, and a captured image 204 is an image captured by the rear camera 24. These images are arranged on a two-dimensional plane represented by orthogonal coordinates S and T as illustrated in FIG. 20, and are stored in a frame buffer (e.g., the camera image buffer 64 illustrated in FIG. 6). Coordinate values (S, T) are associated with addresses in the frame buffer. Accordingly, each pixel constituting these images can be retrieved from the frame buffer by specifying coordinate values (S, T) representing the positon of the pixel. These captured images are projected onto a three-dimensional projection plane defined in three dimensional space around the vehicle, thereby generating a synthesized image showing three dimensional space around the vehicle.

Figure 21:
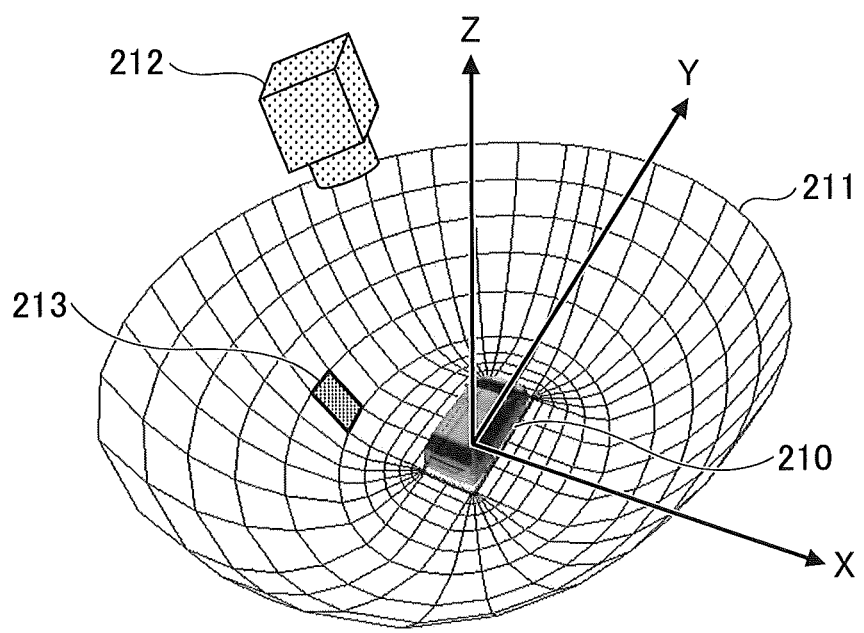
FIG. 21 is a drawing illustrating an example of a three-dimensional projection plane defined around the vehicle.

FIG. 21 is a drawing illustrating an example of a three-dimensional projection plane defined around the vehicle. A three-dimensional projection plane 211 is bowl shaped such that the three-dimensional projection plane 211 extends along the road surface in proximity of a vehicle 210, and goes upward, namely toward the positive direction in the Z axis, away from the road surface as the distance from the vehicle 210 increases. The three-dimensional projection plane 211 is defined by a plurality of polygons linked together whose positions are represented by orthogonal coordinates X, Y, and Z. In the example illustrated in FIG. 21, a quadrilateral is used as each polygon. The position of each vertex of a polygon is represented by the values of the three dimensional coordinates (X, Y, Z) illustrated in FIG. 21.

Quadrilaterals corresponding to the polygons constituting the three-dimensional projection plane 211 are shown on the captured images 201 through 204 illustrated in FIG. 20. For example, a quadrilateral 205 shown in FIG. 20 corresponds to a polygon 213 on the three-dimensional projection plane 211 illustrated in FIG. 21. In this manner, the three dimensional coordinates (X, Y, Z) of each vertex constituting the three-dimensional projection plane 211 illustrated in FIG. 21 are associated in one-to-one correspondence with the two dimensional coordinates (S, T) illustrated in FIG. 20.

FIG. 22 is a drawing illustrating an example of the data structure of a polygon data table. In this polygon data table, the table column for "POLYGON ID" stores identification numbers uniquely identifying each polygon constituting the three-dimensional projection plane 211. The table column for "VERTEX ID" stores identification numbers uniquely identifying the vertexes (four in this example) of a polygon identified by the polygon ID. Vertexes having the same identification number are the same vertex. XYZ coordinate values indicative of the position of each vertex are stored in the vertex data table.

FIG. 23 is a drawing illustrating an example of the data structure of the vertex data table. In the vertex data table, the table column for "VERTEX ID" stores identification numbers corresponding to the vertex IDs in the polygon data table illustrated in FIG. 22. The table column for "COORDINATES OF VERTEX ON PROJECTION PLANE" stores XYZ coordinate values of a vertex in the same table row that stores the identification number (i.e., the number in "VERTEX ID") of this vertex. The table column for "COORDINATES ON INPUT IMAGE" stores ST coordinate values of a vertex in the same table row that stores the identification number (i.e., the number in "VERTEX ID") of this vertex. This vertex data table provides correspondence between the coordinates of a vertex on the projection plane (i.e., XYZ coordinates of a vertex of a polygon in FIG. 21) and coordinates on the input image (i.e., ST coordinates of a vertex of a quadrilateral in FIG. 20).

The relationships between the XYZ coordinates and the ST coordinates represented by the vertex data table are obtained in advance by using the positons and view directions of the cameras 21 through 24 mounted on the vehicle and the internal parameters of these cameras. Synthesizing a full 360-degree video image is performed by rendering each polygon in the polygon data table as viewed from any virtual view point defined in three dimensional space. This rendering, which is a typical process for three dimensional graphics, processes an input image by use of texture polygon rendering that treats an input image as a texture image, coordinates (S, T) as texture coordinates, and coordinates (X, Y, Z) as the coordinates of polygon vertexes. With this arrangement, a full 360-degree image is synthesized as viewed from any desired viewpoint. When generating a synthesized image in this manner, the image synthesizing process for an articulated vehicle as described in connection with FIG. 11 may be performed in a conjunctive manner, thereby generating a proper full 360-degree image for the articulated vehicle. Placing a viewpoint directly above the vehicle enables a downward image as illustrated in FIG. 7 to be generated.

Further, although the present invention has been described with reference to the embodiments, the present invention is not limited to these embodiments, and various variations and modifications may be made without departing from the scope as defined in the claims.

For example, although the embodiments have been described with respect to a configuration in which the left camera 21 and the right camera 22 are wide-angle cameras of 180 degrees or more, this configuration is not intended to be limiting. Instead of using such wide-angle cameras, a plurality of cameras each having a field of view covering smaller than 180 degrees may be provided, so that these cameras collectively cover the camera angles ranging from the right and left sides of the vehicle to the rear of the vehicle.

Although the embodiments have been described with respect to a configuration in which the left camera 21 and the right camera 22 are mounted on the first vehicle section 10, this configuration is not intended to be limiting. The left camera 21 and the right camera 22 may be mounted on other positions, and may be mounted on the second vehicle section 11, for example. In this case, when the first vehicle section 10 is bent relative to the second vehicle section 11, an image captured by the left camera 21 or the right camera may be inserted into the road surface area exposed after the first vehicle section 10 has left.

The embodiments have been described with respect to a configuration in which an angle sensor is used, this configuration is not intended to be limiting. Instead of using an angle sensor, the positions of the vehicle sections appearing in a captured image may be detected by image processing based on the image captured by at least one of the left camera 21 and the right camera 22, thereby allowing the bending angle to be estimated.

What is claimed is:

1. A surround view monitor apparatus, comprising:
   two imaging devices mounted on a first vehicle section of an articulated vehicle to capture two respective images that include, within fields of view thereof, a view of a road surface area that becomes visible to one of the two imaging devices when the first vehicle section and a second vehicle section are in a bent state, the road surface area being situated under the second vehicle section and not visible to the two imaging devices when the first vehicle section and the second vehicle section are in an unbent state;
   a control electronic circuit configured to select one of the two images as an image to be displayed on the road surface area, which becomes visible only in the selected one of the two images upon bending of the second vehicle section, in response to a bending angle between the first vehicle section and the second vehicle section, and configured to combine the two images to generate a synthesized image showing surroundings of the articulated vehicle; and
   a display monitor configured to display the synthesized image.

2. The surround view monitor apparatus as claimed in claim 1, wherein the control electronic circuit is configured to generate a vehicle image showing the articulated vehicle in response to the bending angle and to combine the vehicle image with the synthesized image.

3. The surround view monitor apparatus as claimed in claim 2, wherein the control electronic circuit is configured to generate the vehicle image as being bent at an angle corresponding to the bending angle.

4. The surround view monitor apparatus as claimed in claim 3, wherein the control electronic circuit is configured to select a first image among the two images when the bending angle indicates rightward bending, and to select a second image among the two images when the bending angle indicates leftward bending, and configured to use a partial image of the selected first or second image as an image to be displayed on the road surface area, the partial image having a constant size regardless of size of the bending angle.

5. The surround view monitor apparatus as claimed in claim 1, wherein the control electronic circuit is configured to obtain information indicative of the bending angle from an angle sensor disposed at a pivot joint between the first vehicle section and the second vehicle section.

6. The surround view monitor apparatus as claimed in claim 1, wherein the control electronic circuit is configured to obtain information indicative of the bending angle from an apparatus for controlling a steering direction of the articulated vehicle.

7. The surround view monitor apparatus as claimed in claim 1, wherein the imaging devices are mounted on the first vehicle section at a position higher than an upper face of the second vehicle section.

8. The surround view monitor apparatus as claimed in claim 1, wherein the articulated vehicle is a snow blower vehicle which includes a snow blower machine.

9. A method for processing an image, comprising:
   receiving two images captured by two respective imaging devices mounted on a first vehicle section of an articulated vehicle, the two images including, within fields of view thereof, a view of a road surface area that becomes visible to one of the two imaging devices when the first vehicle section and a second vehicle section are in a bent state, the road surface area being situated under the second vehicle section and not visible to the two imaging devices when the first vehicle section and the second vehicle section are in an unbent state;

receiving bending angle information indicative of a bending angle between the first vehicle section and the second vehicle section; and selecting one of the two images as an image to be displayed on the road surface area, which becomes visible only in the selected one of the two images upon bending of the second vehicle section, in response to the bending angle indicated by the bending angle information, and combining the two images to generate a synthesized image showing surroundings of the articulated vehicle.

10. A non-transitory computer-readable recording medium having a program embodied therein for causing a computer to perform:

receiving two images captured by two respective imaging devices mounted on a first vehicle section of an articulated vehicle, the two images including, within fields of view thereof, a view of a road surface area that becomes visible to one of the two imaging devices when the first vehicle section and a second vehicle section are in a bent state, the road surface area being situated under the second vehicle section and not visible to the two imaging devices when the first vehicle section and the second vehicle section are in an unbent state;

receiving bending angle information indicative of a bending angle between the first vehicle section and the second vehicle section; and selecting one of the two images as an image to be displayed on the road surface area, which becomes visible only in the selected one of the two images upon bending of the second vehicle section, in response to the bending angle indicated by the bending angle information, and combining the two images to generate a synthesized image showing surroundings of the articulated vehicle.

\* \* \* \* \*